US009906427B2

United States Patent
Siemens et al.

(10) Patent No.: US 9,906,427 B2
(45) Date of Patent: Feb. 27, 2018

(54) METHOD FOR PERFORMING A BANDWIDTH TEST FOR COMMUNICATIONS FROM A FIRST NETWORK STATION TO A SECOND NETWORK STATION OF A COMMUNICATION NETWORK AND CORRESPONDING APPARATUSES FOR PERFORMING THE METHOD STEPS AND CORRESPONDING COMPUTER PROGRAM PRODUCTS

(71) Applicant: Hochschule Anhalt, Köthen (DE)

(72) Inventors: Eduard Siemens, Sehnde (DE); Dimitry Kachan, Köthen (DE)

(73) Assignee: Hochschule Anhalt, Kothen (DE)

( * ) Notice: Subject to any disclaimer, the term of this patent is extended or adjusted under 35 U.S.C. 154(b) by 0 days.

(21) Appl. No.: 14/894,773

(22) PCT Filed: May 18, 2015

(86) PCT No.: PCT/EP2015/025025
§ 371 (c)(1),
(2) Date: Jun. 13, 2016

(65) Prior Publication Data
US 2016/0344608 A1 Nov. 24, 2016

(51) Int. Cl.
*H04L 12/24* (2006.01)
*H04L 12/26* (2006.01)
(52) U.S. Cl.
CPC .......... *H04L 43/12* (2013.01); *H04L 41/0896* (2013.01); *H04L 41/147* (2013.01); *H04L 43/024* (2013.01); *H04L 43/087* (2013.01)

(58) Field of Classification Search
CPC . H04L 41/0896; H04L 41/147; H04L 43/024; H04L 43/087; H04L 43/12
See application file for complete search history.

(56) References Cited

U.S. PATENT DOCUMENTS

| | | | | |
|---|---|---|---|---|
| 2009/0003369 A1* | 1/2009 | Lundin | ................. | H04J 3/0632 370/412 |
| 2015/0180757 A1* | 6/2015 | Oshiba | ................. | H04L 47/365 370/252 |

OTHER PUBLICATIONS

Siemens Eduard, et al. "Available Bandwidth Measurement for 10 Gbps Networks", 2015 International Siberian Conference on Control and Communications (SIBCON), 2015.

(Continued)

*Primary Examiner* — Andrew Lai
*Assistant Examiner* — M Mostazir Rahman
(74) *Attorney, Agent, or Firm* — Howard IP Law Group

(57) ABSTRACT

A method for performing a bandwidth test for communications from a first network station to a second network station of a communication network is based on the probe rate model (PRM) in which iteratively a train of probe sample packets is transmitted from the first station to the second station with a constant packet rate per iteration. The packet rate is adapted to the available bandwidth on the data pipe per iteration. According to the disclosure the number of probe packets per train of probe sample packets is varied with the available bandwidth per iteration. This increases the accuracy of the test, in particular, in the range where a high data rate is available on the data pipe. A step decreasing factor (SDF) is applied with which the performance test is improved. Such step decreasing factor is dependent on the network jitter and further improves the performance of the test.

10 Claims, 10 Drawing Sheets

(56) References Cited

OTHER PUBLICATIONS

Jain, Manish, Dovrolis, Constantinos, "End-to-End Available Bandwidth: Measurement Methodology, Dynamics, and Relation with TCP Throughput", SIGCOMM '02, Aug. 19-23, 2002, Pittsburgh Pennsylvania.

Sommers, Joel, et al., "A Proposed Framework for Calibration of Available Bandwidth Estimation Tools", 11th IEEE Symposium on Computers and Communications, 2006, ISCC '06, Proceedings 2006, pp. 709-718.

* cited by examiner

METHOD FOR PERFORMING A BANDWIDTH TEST FOR COMMUNICATIONS FROM A FIRST NETWORK STATION TO A SECOND NETWORK STATION OF A COMMUNICATION NETWORK AND CORRESPONDING APPARATUSES FOR PERFORMING THE METHOD STEPS AND CORRESPONDING COMPUTER PROGRAM PRODUCTS

CROSS REFERENCE TO RELATED APPLICATIONS

This application claims priority to, and is a national phase application under 35 U.S.C. § 371 of International Patent Application No. PCT/EP2015/025025 filed May 18, 2015, which is incorporated herein by reference for all purposes.

BACKGROUND

Active network measurement is a way to get information about network connection characteristics for using network resources in a most efficient way. "Active measurement" in this context means network performance measurements based on the injection of additional data packets into the data network. The measurement is then performed by analyzing the basic parameters of such probe samples. The most important parameters hereby are one-way delay (OWD) and inter packet time interval measured in the receiving station (IpIR). This is the time interval between receptions of two consecutive arriving samples. The receiving station takes the time when the probe sample data packets arrive and calculates the inter packet time interval (IpIR). In the following for the long expression "probe sample data packets" the short forms "probe sample packet" or "probe packet" are synonymously used. An example of a "probe sample data packet" is an UDP datagram that contains a time stamp showing the time of the sending station when this datagram has been sent. UDP here stands for the well-known user datagram protocol.

Due to variations in transmission paths and in queuing hold-up, the transmission delays experienced by the different packets can vary considerably in a non-deterministic way. In extreme cases, a packet sent earlier may arrive at a later time than one that was sent later.

There exists in literature a so-called probe rate model (PRM). According to this model, the sender iteratively sends probe sample packets via the network to a receiver. Per iteration the measurement is performed with a different constant bit rate (CBR). Per iteration, the sender sends a so called train of probe samples—certain amount of consecutive probe samples sent with a constant inter packet time interval (IpIS) measured in the sending station. After reception of the train of probe samples, the receiver analyses the received datagrams and their arrival times and makes a suggestion whether the CBR in the last iteration was higher than the available bandwidth or not. If the result shows that CBR is higher—then the receiver generates a new inter-packet time interval that should be used by sender (IpIS) for the next iteration. So, this will be fed back to the sender in a message. The relation between CBR and IpIS is shown in equation (1)

$$CBR = \frac{SS}{IpIS}, \quad (1)$$

where SS is the Segment Size of the UDP packet.

Measurements according to the PRM model begin with a maximum possible CBR (e.g. with the link data rate at the sender, i.e. probe packets are "pumped" into the data pipe with the minimum possible distance in time) and then iteratively decreased until the receiver assumes, that the CBR of the last iteration was not higher than the available bandwidth on the path between the data sender and data receiver. This is the end point of the measurement phase and the available bandwidth is assumed to be not less than the last used CBR.

The PRM model is described in the following articles:

[1] M. Jain and C. Dovrolis, "End-to-end available bandwidth: measurement methodology, dynamics, and relation with TCP throughput," IEEEACM Trans. Netw., vol. 11, no. 4, pp. 537-549, August 2003.

[2] J. Sommers, P. Barford, and W. Willinger, "A Proposed Framework for Calibration of Available Bandwidth Estimation Tools," in 11th IEEE Symposium on Computers and Communications, 2006. ISCC '06. Proceedings, 2006, pp. 709-718.

SUMMARY

The accuracy of measurements has a correlation with the amount of probe samples that have been delivered into the data pipe per iteration. The more samples are injected into the connection, the higher accuracy is provided by the given measurement method. However, injection of probe samples into the network could also be the cause of congestion or a decrease of service quality in the network. That is why it is important to find some optimal value of the amount of probe samples per iteration that will be big enough to provide an acceptable bandwidth accuracy and small enough to not consume a lot of network resources. Also important is the duration of measurement. In general a packet switched network is a dynamic system and the available bandwidth is significantly changing over the time. To make the reaction on network changes fast it is necessary to estimate available bandwidth as soon as it is possible. Also, the measurement duration depends on the amount of samples issued per iteration. The fewer samples are sent, the faster the measurement can be completed. Thus, it is an object of the invention to optimize the method of active bandwidth measurements in particular, the Probe Rate Model (PRM).

The solution according to the invention firstly is based on the idea to use a variable amount of probe sample packets for different rates with which probe sample packets are injected onto the data pipe.

With experiments, an optimized form of the dependency of the amount of probe sample packets from the probe rate has been found. Such dependency can be easily implemented with the formula:

$$N(R) = \begin{cases} 50, & \text{if } R < 100 \ Mbps \\ 32.57 \cdot \ln(0.046 \cdot R), & \text{if } R \geq 100 \ Mbps \end{cases} \quad (2)$$

where R is the probe packet bit rate in Mbps used for an iteration, and N is the amount of samples that should be sent in the next iteration.

In a further embodiment of the invention, calculations with a modified formula which lead to results in the range of ±20% deviations from the calculation results according to the listed formula are tolerated.

These features of the invention provide for a more efficient performance test mainly in terms of a reduced estimation/testing time and a reduced amount of overhead network traffic for the test.

Another aspect of the invention lies in the idea to adapt the performance test to the network jitter. The inventors recognized that there is a high probability that the estimation of the network performance will be wrong if the packet delay jitter is high. So, it is another idea of the invention to evaluate the network jitter and to adapt the adjustment step of an iteration during the test to the network jitter with a step decreasing factor.

Again with experiments an optimized dependency of the step decreasing factor on the network jitter has been found. Thereby as a metric the ratio between network jitter and the perceived inter packet time interval has been introduced. Such dependency can be easily implemented with the formula:

$$IpIS_{next} = IpIS_{curr} + \frac{|IpIR - IpIS_{curr}|}{SDF(JtI)} \quad (3)$$

whereby $IpIS_{next}$ is the adjusted inter packet time interval to be used for the next iteration in the source device, $IpIS_{curr}$ is the inter packet time interval with which probe sample packets have been injected onto the data pipe during the previous iteration and SDF is the step decreasing factor. It is defined to apply the step decreasing factor SDF with the formula $$SDF(JtI) = \begin{cases} 1.5, & \text{if } JtI < 0.5 \\ 1.08 \cdot \exp(0.65 \cdot JtI), & \text{if } JtI \geq 1 \end{cases} \quad (4)$$

whereby JtI is the ratio of the measured deviation of network jitter $\sigma_{jitter}$ to the perceived inter packet time interval IpIR per iteration.

With such adaptation of the step decreasing factor the amount of iterations can be subjectively decreased in case of low changes of jitter values without losing the accuracy of the performance test. At the same time, this improved performance test provides for more iterations in case of higher changes of jitter values to provide for a reasonable accuracy of the performance test.

The invention also concerns correspondingly adapted apparatuses to perform the method steps of the invention either for the source device or for the destination device.

The invention also concerns corresponding computer program products with instructions which perform the method steps of the invention either for the source device or for the destination device when run in a computing system.

BRIEF DESCRIPTION OF THE DRAWINGS

In the following, the invention will be described by means of advantageous embodiments with reference to figures of a number of drawings. Herein.

DETAILED DESCRIPTION OF THE PREFERRED EMBODIMENTS

Figure 1:
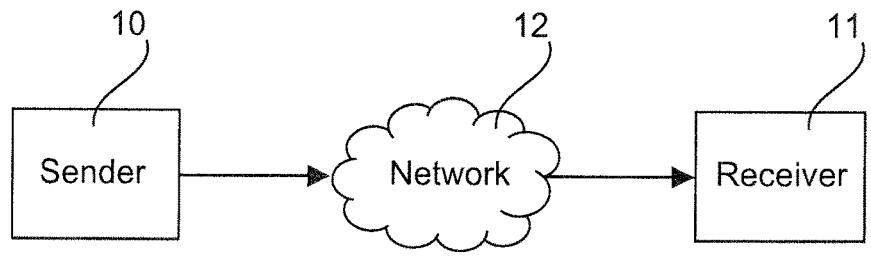
FIG. 1 shows the principle structure of a network in which two network stations in the form of standard PCs or workstations or computers in general are connected to a wide area network and are exchanging messages in the form of data packets in general.

In FIG. 1 network node 10 and network node 11 are connected to a wide area network WAN 12 and communicate via data packets, for example in an Internet environment with TCP/IP protocol or the connectionless UDP/IP protocol. TCP here stands for the connection oriented transmission control protocol and IP is the Internet protocol.

Figure 2:
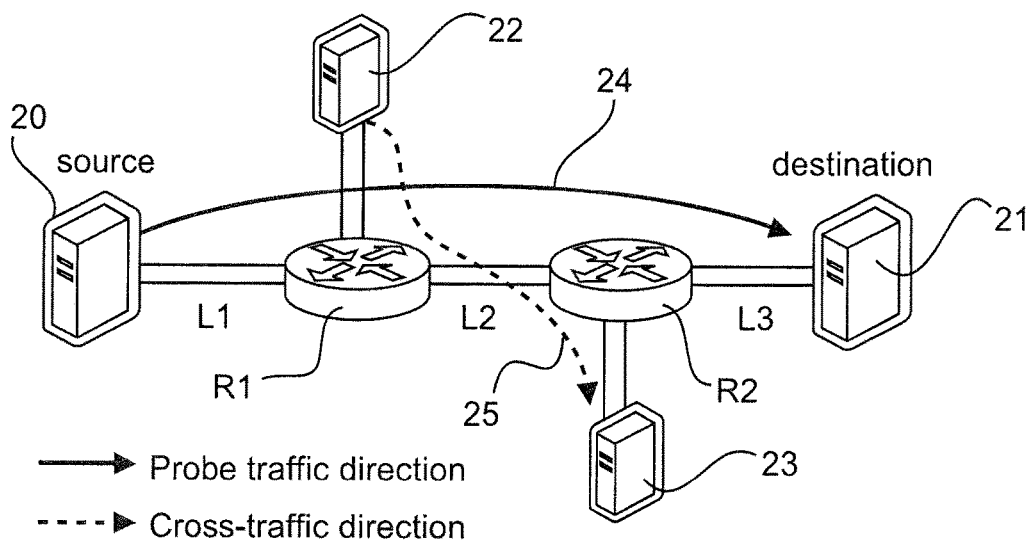
FIG. 2 shows the network traffic caused by the bandwidth test according to the invention between a sending station and a receiving station crossed by normal network traffic.

The available bandwidth measurement is performed between a source node 20 and destination node 21 which are stations in a wide area network (WAN). This principle network structure is illustrated in FIG. 2. Typically, the transfer path leads along a number of intermediary stations which may be switches or routers. In the drawing there are only two routers R1 and R2 depicted, but in reality there may be many more routers along the path. The probe-traffic is indicated by means of reference number 24. There is a cross-traffic 25 in the network which comes from communications from network station 22 to station 23. The cross traffic 25 has the same direction as the probe-traffic on the link L2.

Figure 3:
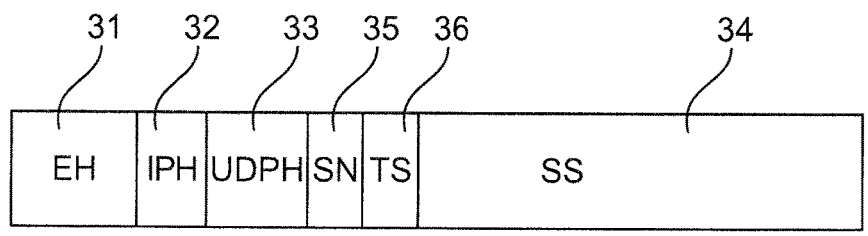
FIG. 3 shows the structure of a probe sample data packet.

The probe-traffic consists of a plurality of probe sample packets in the form of UDP packets. The structure of a probe sample packet is depicted in FIG. 3. The probe sample packet is a usual UDP packet, with several header sections 31 to 33 and a payload section 34. FIG. 3 also shows the nesting of a UDP packet in an Ethernet packet. The Ethernet header is in section 31, the IP header in section 32 and the UDP header in section 33. In the payload section 34 probe sample packets contain a time stamp 35 and optionally a sequence number 36. The time stamp 35 indicates the point in time the source station 20 has sent the packet on the communication path. It is the clock inside the source station 20 with which this time stamp 35 is generated. The segment numbers help to distinguish the different probe samples and to easily sort them in the receiver 21 into the transmission order. The payload of the datagram contains 64 bits for the sequence number 36, and 128 bits for the timestamp 35—(64 bit for seconds and 64 bits for nanoseconds). All the rest in the payload section 34 are dummy bits that do not contain any meaningful information. It is noted that the segment size SS corresponds to the payload section 34 of the UDP packet. A probe sample packet which respects the maximum transmission unit size (MTU) of 1500 Bytes has 1472 bytes in the payload section 34 if an IPv4 header 32 is used.

Figure 4:
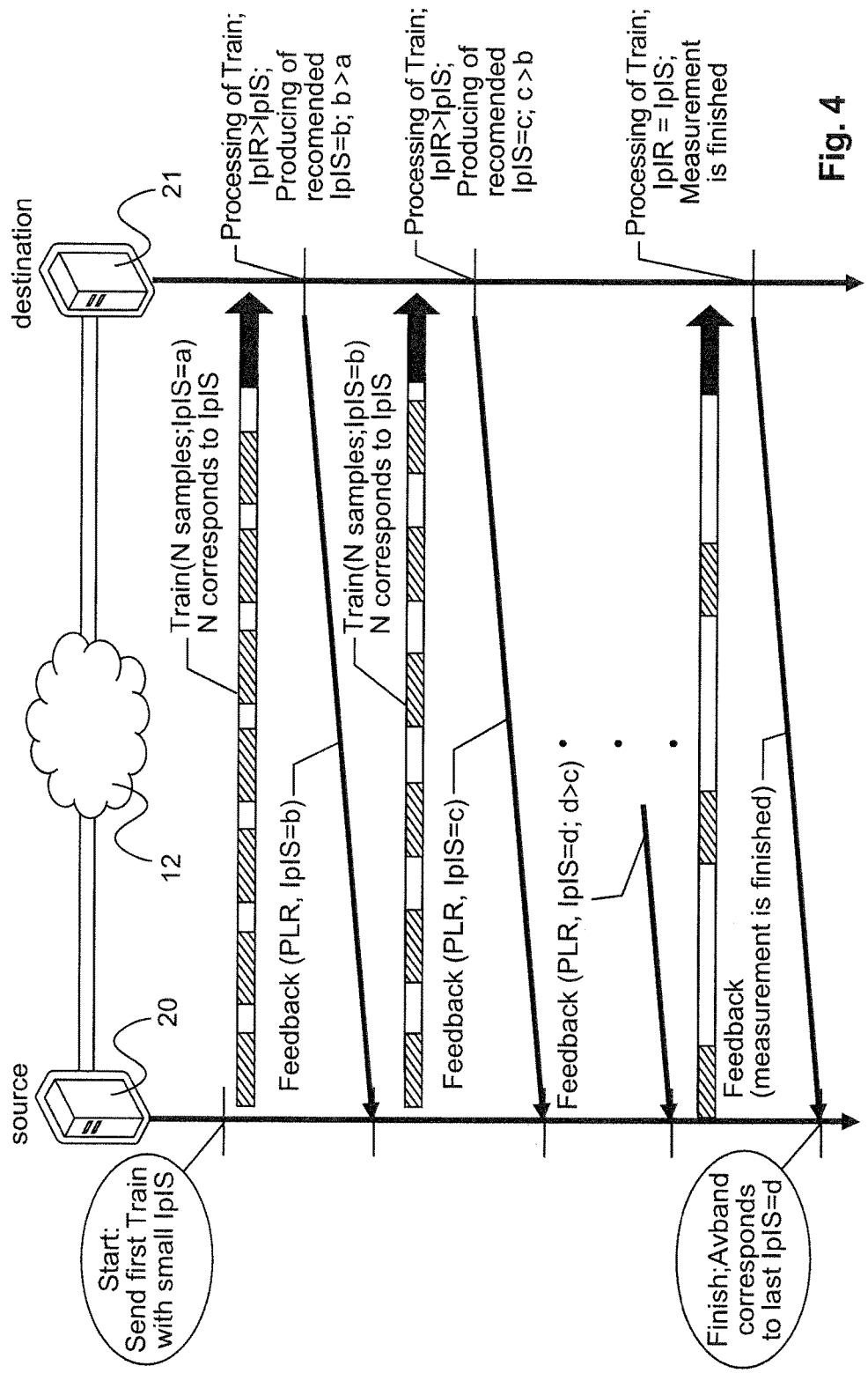
FIG. 4 shows the principle bandwidth testing process with several iterations of sending trains of probe sample packets from the source device and corresponding feedback messages from the destination side.

FIG. 4 illustrates the different iterations of the available bandwidth test. The test starts with the sending of a first train of probe sample packets from source station 20 to destination station 21 via network 12. The probe sample rate is high, seen at the small gaps in between the successive probe sample packets in the first train of probe sample packets. The destination station 21 takes its own time stamps on reception of the probe sample packets and evaluates the time stamps 35 in the received probe sample packets, calculates the inter packet interval IpIS with the received time stamps and the inter packet interval IpIR with the own generated time stamps and compares them. It sends back a recommendation for a new IpIS time in a feedback message to the source station 20. The Simple Object Application Protocol (SOAP) is used for sending back feedback messages in the preferred embodiment. The feedback message also contains information about the Packet Loss Ratio (PLR) estimated at the reception side. The source station 20 in the second iteration sends the second train of probe sample packets with a probe sample rate corresponding to the recommended IpIS time received in the feedback message. Due to some cross-traffic the probe sample rate in the first iteration likely will be too high, therefore the recommended IpIS time is higher than the IpIS time applied in the first iteration. In this form the IpIS time will be successively increased in a number of iterations as depicted in FIG. 4. Once the destination station 21 recognizes that the measured IpIR time is equal or almost equal in terms of a set tolerance to the recommended IpIS time, the available bandwidth test is finished and the source station will use the last IpIS time for the following communications to destination station 21 until the next available bandwidth test is made.

According to the measurement algorithm, source 20 sends probe samples with some constant sample rate (constant IpIS) to the destination 21. Note that the sample rate in the following will be measured in a virtual bit rate which only corresponds to the real bit rate on the physical layer of the network if exclusively probe sample packets are sent over the network one after the other without gaps. If the probe packets are sent with gaps it means that such gaps may be filled with other network traffic. The gaps may however not remain constant from one link to the other since other network traffic may also arrive at a router and normally the routing algorithm makes sure that all network traffic is forwarded towards its destination in a fair manner. That means other communication packets will be interspersed before the next probe sample packet is routed. Therefore, due to interaction with cross-traffic the inter-packet time interval as perceived in the destination device 21 is changing. This is illustrated in FIG. 5.

Figure 5:
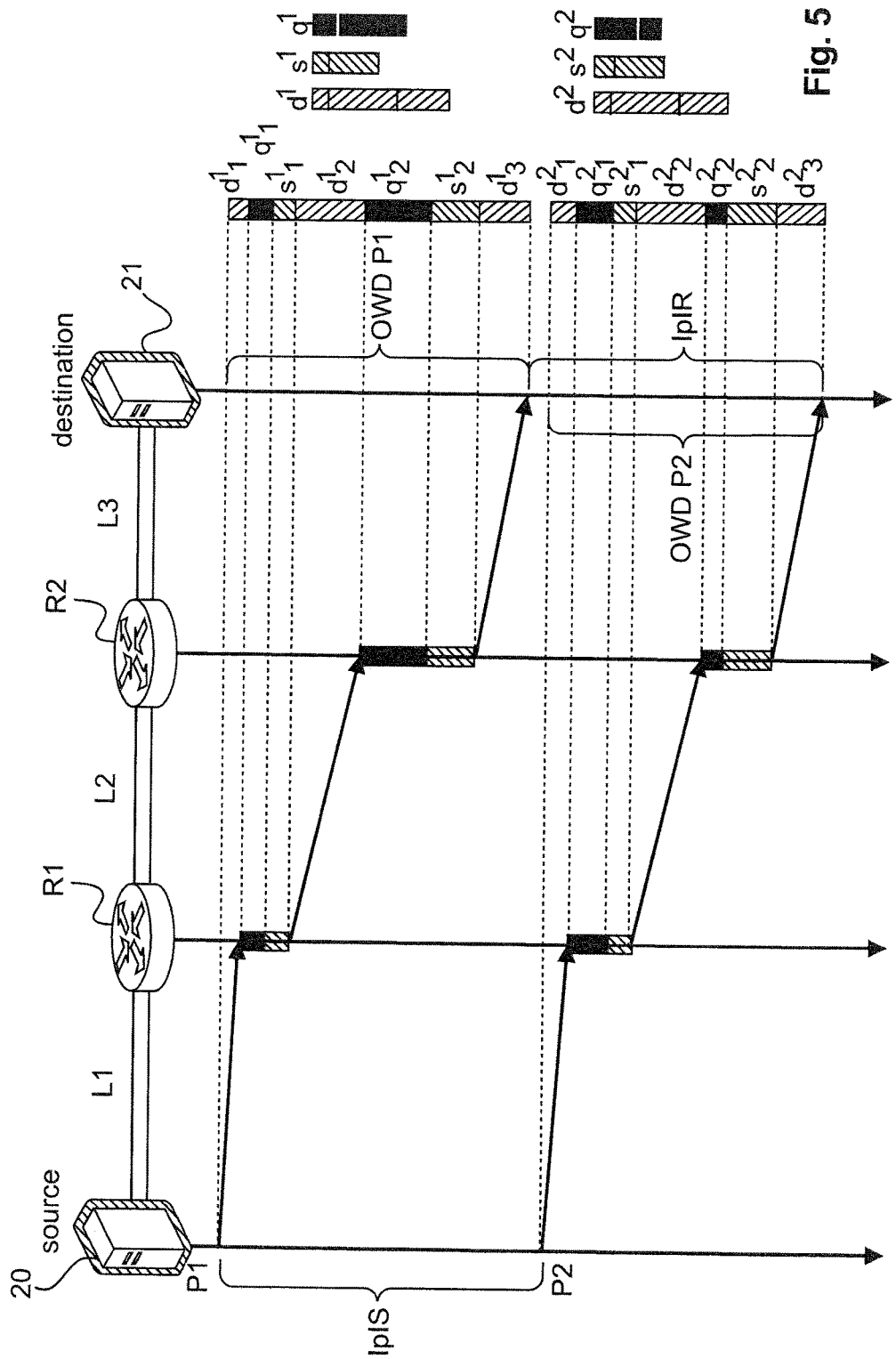
FIG. 5 shows the different delay components a packet experiences during its trip from source device to the destination device through the network.

The sending of each probe sample packet can be presented as it is shown in the FIG. 5. In the picture the IpIS, OWD and IpIR time periods are shown. The components of the observed OWD value is also depicted in the picture as following: d—is a propagation delay (time for passing the physical media—corresponds to the speed of light on that media), s—service delay (service action of the router like copying of the data packet from buffer to buffer etc.), q—queueing delay—the time that packet spent in a queue of a router because of cross-traffic which also needs to be handled in a fair manner.

Figure 6:
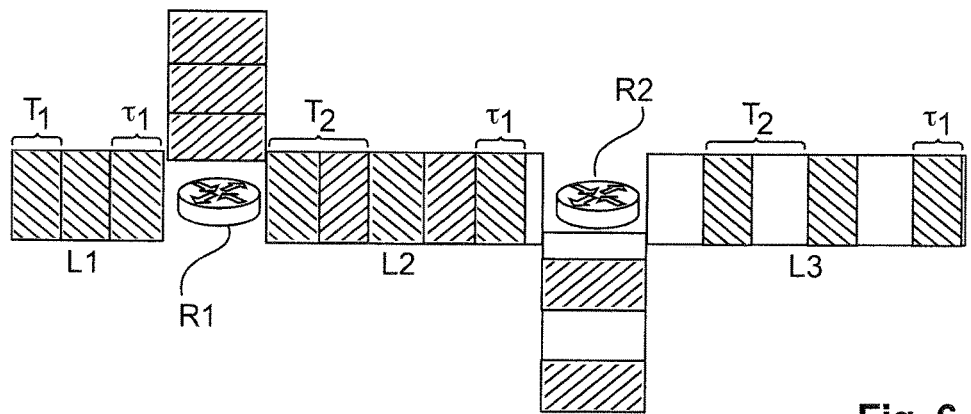
FIG. 6 shows the process of sending a train of probe packets from source device to destination device in a first iteration of testing the available bandwidth.

To look deeper into the interaction between probe traffic and cross traffic consider FIG. 6.

In FIG. 6, T—is an inter-packet time interval, τ—is a time of a packet to be transmitted. The last value depends on the capacity of a link. Consider that all three links have the same capacity and this value doesn't change during the transmission. Then the inter-packet time in the link L1-$T_1$, in an ideal case, is IpIS—the time interval from the back part of one packet to the back part of the next packet. In the router between L1 and L2 the probe traffic interacts with cross traffic. As consequence the inter packet time interval is increasing to $T_2$ on link L2. To the destination it comes with the perceived inter packet time interval $T_2$, which in that case will be IpIR.

Now consider how the inter packet time intervals are changing among the successive iterations.

Figure 7:
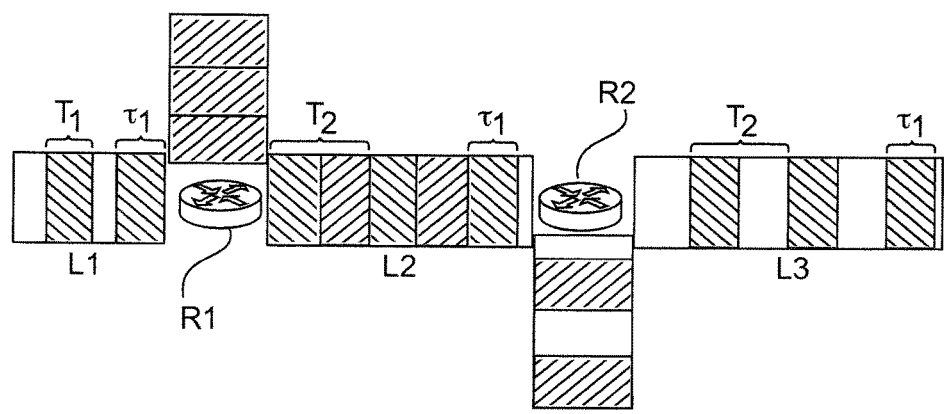
FIG. 7 shows the process of sending a train of probe packets from source device to destination device in a second iteration of testing the available bandwidth.

Since the situation in FIG. 6 represents the first iteration then the second iteration could be presented as it is shown in FIG. 7.

The inter packet time interval IpIS ($T_1$) is increased in the source device due to the SOAP message with which the recommended next IpIS time is reported back. However the interaction with the cross-traffic still changes the inter-packet interval in the second iteration. So, IpIR again is equal to $T_2$ that still is different from IpIS. The destination device then again recommends an increased IpIS time.

Figure 8:
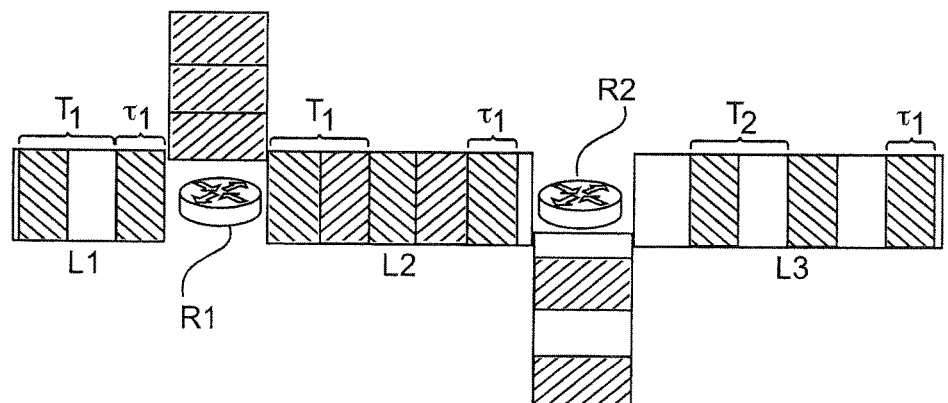
FIG. 8 shows the process of sending a train of probe packets from source device to destination device in a third iteration of testing the available bandwidth.

After several iterations, IpIS is becoming closer to IpIR as presented in FIG. 8. Here, the $T_1$ value is not changed when the packet passes the router R1 and therefore is not renamed to $T_2$. In an almost never ideal case (what almost never happens in reality), the IpIR value is equal to IpIS. In that case, the available bandwidth is equal to the last rate that has been used by the source device 20. As a consequence only $\tau_1$ is unchangeable on the entire path during all the iterations.

The impact of the amount of probe samples on the accuracy of the available bandwidth measurement can be clearly observed on high speed connections up to 10 Gbps.

Figure 9A:
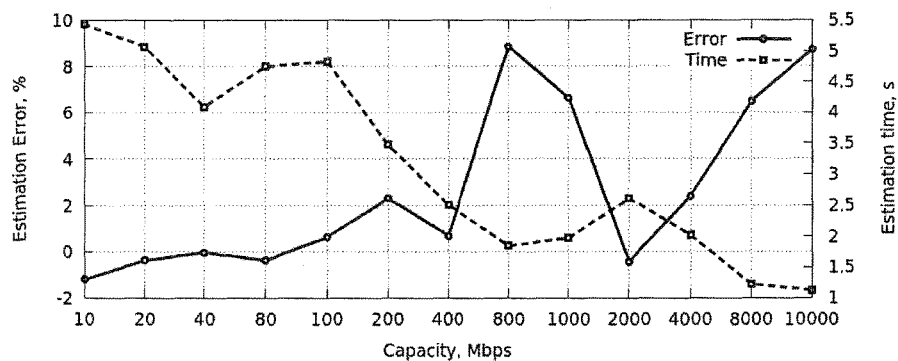
FIG. 9 shows the test results in terms of accuracy of estimated available bandwidth and corresponding estimation time in dependence of the data rate in a); the corresponding number of iterations for the same measurement points in b); and the corresponding load of the available bandwidth on the data pipe due to the sending of probe packets for the available bandwidth test in c) for a test in which per iteration a train of 50 probe sample packets is sent.
Figure 9B:
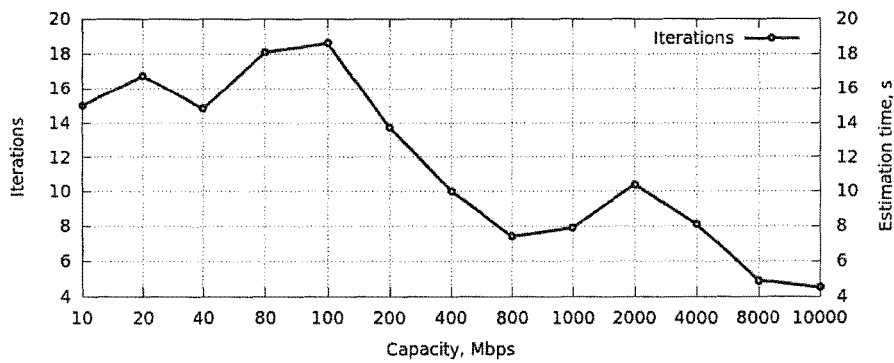
Figure 9C:
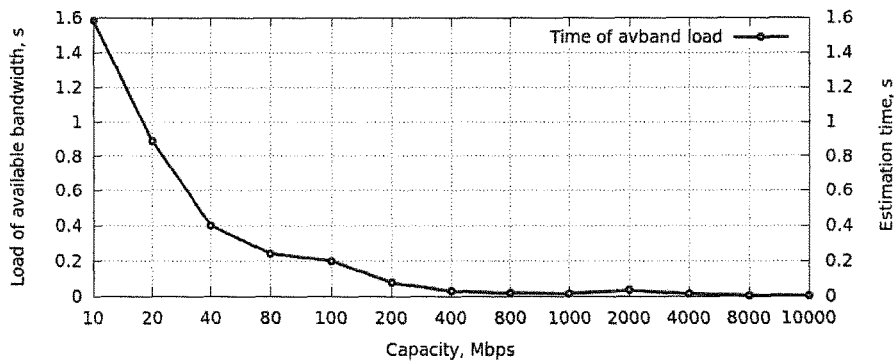
Figure 10A:
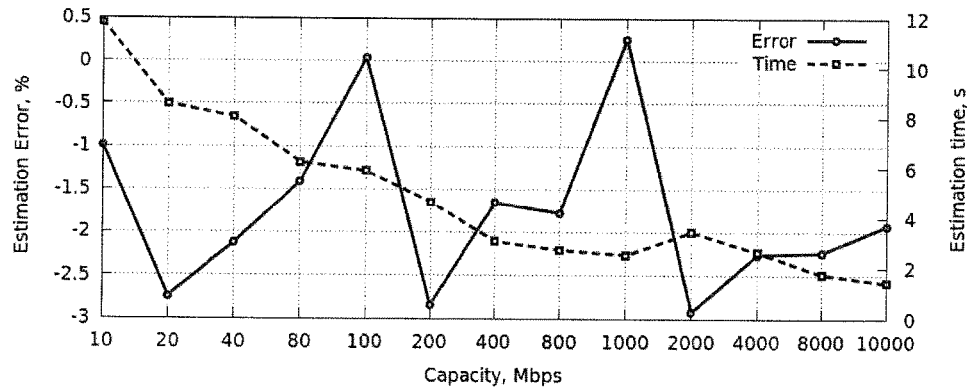
FIG. 10 shows the test results in terms of accuracy of estimated available bandwidth and corresponding estimation time in dependence of the data rate in a); the corresponding number of iterations for the same measurement points in b); and the corresponding load of the available bandwidth on the data pipe due to the sending of probe packets for the available bandwidth test in c) for a test in which per iteration a train of 200 probe sample packets is sent.
Figure 10B:
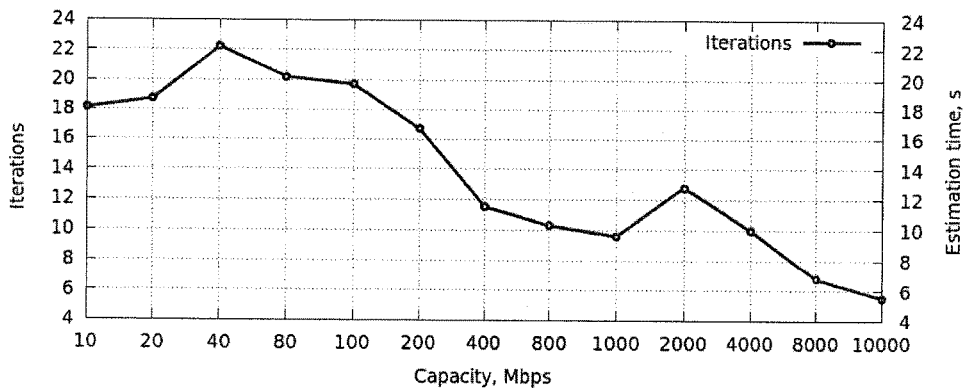
Figure 10C:
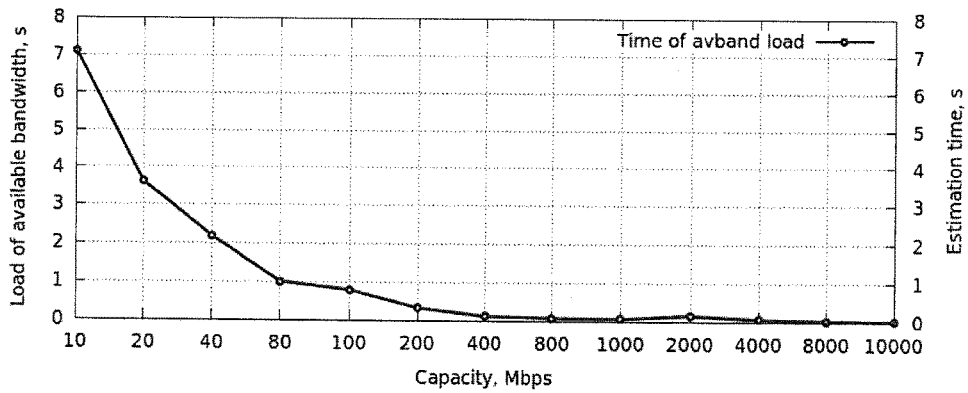

The plots of the measurement results in the FIGS. 9 and 10 show the bandwidth estimation with the following network parameters:
Constant One-way Delay OWD of 40 ms
Packet losses 0.01%.

In FIG. 9a it is easy to observe that the estimation error drawn on the left ordinate axis is growing while the throughput of the data link is increasing. In a single iteration of the bandwidth test, the constant value of probe samples, here the number of 50 datagrams is used. For all the plots the abscissa axis is for the maximum path capacity between the data sender and data receiver. Measurements have been made for the max path capacity in the range of 10 to 10000 Mbps. For illustrative purposes a logarithmic scale is used on the abscissa axis on all plots apart from FIG. 13. During the test, for each estimated value of connection capacity, the connection has been loaded by 40% of additionally generated background UDP traffic. The first graph in FIG. 9a shows the error of bandwidth estimation in percent of available bandwidth on the left ordinate axis and the estimation time in seconds, on the right ordinate axis. The plot "Iterations" in FIG. 9b shows the number of iterations performed to get to the corresponding measurement points in the FIGS. 9a and 9c. The plot "Load of Available Bandwidth" in FIG. 9c shows the virtual time of occupation of entire available bandwidth by all sent probe samples during the test period in seconds. Since the bandwidth increases drastically from left to right, the virtual time of occupation decreases also drastically as expected. In fact the bandwidth is utilized by this probe traffic during the entire time of measurement not only on a part time of the testing phase. So the virtual time means the time which is needed to send all probe packets in the test one after the other without gaps. For clarity it is noted here that the capacity of a data pipe is defined to be the product of bandwidth in bits per seconds with the round trip time RTT in seconds.

It can be seen in FIG. 9a that roughly up to a bandwidth of 100 Mbps 50 samples are sufficient to measure the available bandwidth with an estimation error less than 5%. However if the communication path has a raw throughput higher than 100 Mbps the absolute estimation error becomes higher—up to 9 percent in this plot at 800 Mbps. Up to 1 Gbps, the MTU size 1500 Bytes has been used and above 1 Gbps an MTU size of 9000 Bytes has been used. The MTU value is the maximum transmission unit that can be used on the link layer (layer 2 of the ISO/OSI communication model) without the need for fragmentation of the data packets on the network layer, (layer 3 of the ISO/OSI communication model). It is necessary to operate with packets of bigger size (Jumbo frames) to achieve accurate data rates higher than 1 Gbps. That is why there is an abrupt change from 1500 Bytes to 9000 Bytes packets which is also observable in the FIGS. 9a, 9b and 9c.

The experiment under the same conditions as before, but with an increased amount of samples to a value of 200 is shown in the figures generally denoted as FIG. 10. The behavior of estimation error is improved—the error does not show any values higher than 1% or lower than 3% even by estimation of up to 6 Gbps. However the cost of such improvement is a dramatic increase of estimation time, amount of iterations and corresponding to it, amount of bytes that have been injected into the network for testing purposes.

It is one idea of the invention to use a variable amount of probe samples according to the sending rate with which probe sample packets are delivered to the link layer in the bandwidth test. The testing software calculates the amount of samples according to the formula, described below. That formula has been verified by a set of experiments which have shown that the distribution of the amount of samples shall obey the formula 2:

$$N(R) = \begin{cases} 50, & \text{if } R < 100 \text{ Mbps} \\ 32.57 \cdot \ln(0.046 \cdot R), & \text{if } R \geq 100 \text{ Mbps} \end{cases} \quad 2)$$

where R is the probe packet bit rate in Mbps used for an iteration, and N is the amount of samples that should be sent in the next iteration.

Figure 11:
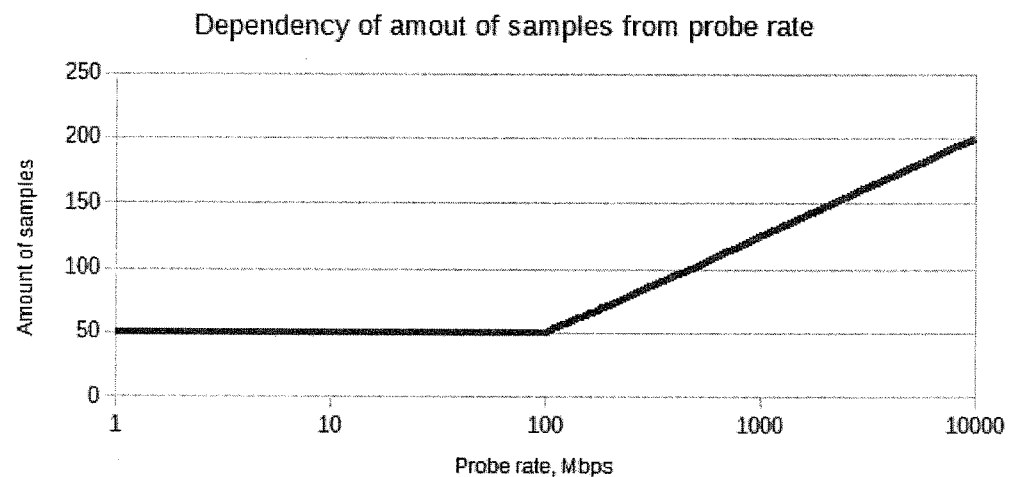
FIG. 11 shows the dependency of the amount of probe sample packets to be used in the bandwidth test in accordance to the invention from the probe bit rate.

The dependence of samples on probe rate is shown in the FIG. 11. Probe rate here means the pseudo bit rate with which all probe packets are sent in one iteration step. With this behavior, the fewer samples will be sent on the low probe rates what helps to provide a high accuracy of measurements while at the same time not much data transport capacity is consumed on the data link. It will also save time for testing the network, since each probe sample packet needs certain time to be sent, and on lower link data rates this time is significant. On the higher rates, more samples will be sent to provide a high accuracy of measurement but the time of measurement will not be increased noticeably since the system needs less time per probe sample packet. If the probe rate is less than 100 Mbps in most cases 50 samples per iteration are sufficient for a good estimation of the available bandwidth with an estimation error less than 5%. With increasing of the probe rate, the amount of testing samples per iteration increases logarithmically and raises up to 200 samples at a bit rate of 10 Gbps. Again, the abscissa axis is scaled in logarithmic scale so that a logarithmically behavior appears in the form of a straight line in FIG. 11.

In general, the amount of samples kept as determined in formula (2) or in a range of +/−20% aside from that, would produce good accuracy on the high rates and will safe time on the low path data rates. So, it is an excellent trade-off between the two criteria, good accuracy and amount of testing time.

Figure 12A:
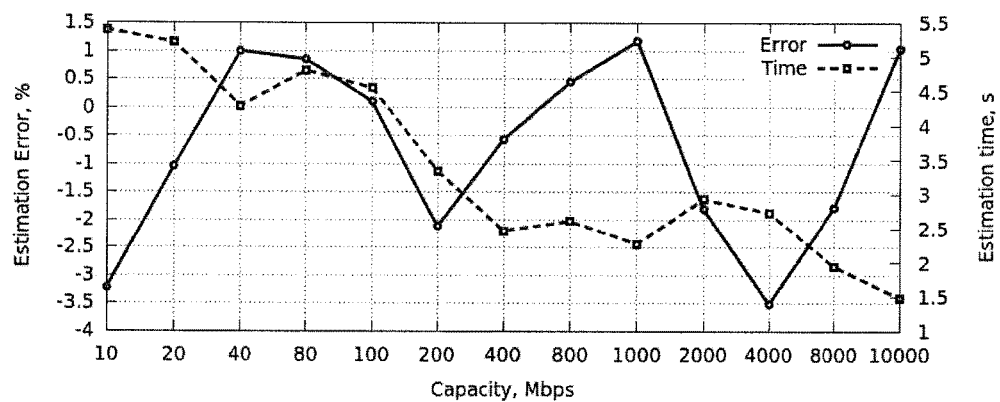
FIG. 12 shows the test results in terms of accuracy of estimated available bandwidth and corresponding estimation time in dependence of the data rate in a); the corresponding number of iterations for the same measurement points in b); and the corresponding load of the available bandwidth on the data pipe due to the sending of probe packets for the available bandwidth test in c) for a test in which per iteration a train with a variable amount of probe sample packets is sent.
Figure 12B:
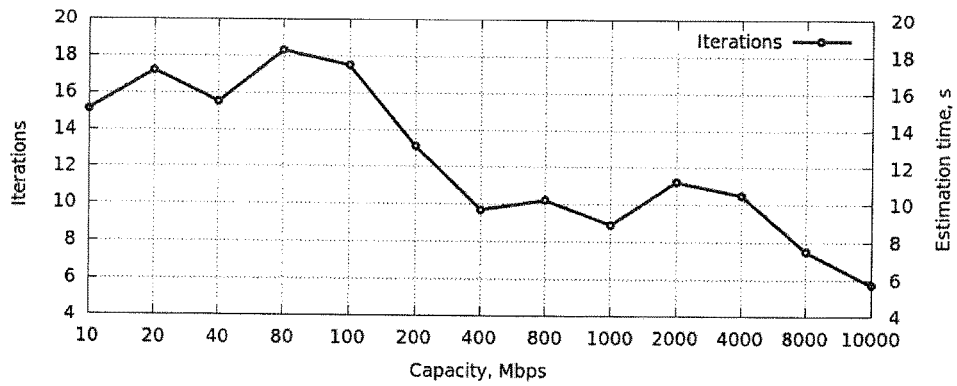
Figure 12C:
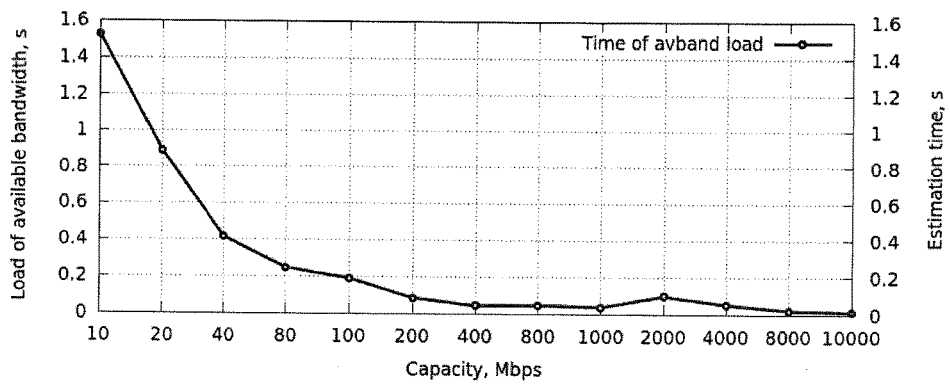

The estimation characteristics are shown in the figures generally denoted as FIG. 12. All three drawings illustrate that the proposed method of using a variable amount of probe samples packets allows achieving of high enough accuracy on high probe rates with a reduced estimation time and amount of overhead traffic. It provides also for high accuracy measurements on lower data rates.

Another important impact factor on accuracy of bandwidth estimation is the Packet Delay Jitter. There is a high probability that the evaluation of probe rate for next iteration will be wrong if the Packet Delay Jitter is high. Jitter normally is defined to mean the variation in the packet arrival times. This corresponds to the standard deviation of the arrival times.

To solve this problem, it is necessary to evaluate the jitter and how much bias it introduces into the measurements. For that purpose according to another embodiment of the invention the standard deviation of jitter is measured and as a metric it is proposed to use the ratio of standard deviation of Packet Delay Jitter to the mean inter-packet interval on reception side, JtI according to formula (5):

$$JtI = \frac{\sigma_{jitter}}{IpIR} \quad 5)$$

where $\sigma_{jitter}$ is the standard deviation of jitter, and IpIR is the mean inter packet Interval as perceived on the reception side during the last iteration.

The best way to make accurate measurements under high jitter dispersion is to make more iterations of a measurement with smaller steps. In the classical way as described in the literature explaining the PRM model, see background part of the invention, the inter-packet interval for the probe rate of the next iteration, is calculated according to formula (6):

$$IpIS_{next} = IpIS_{curr} + \frac{|IpIR - IpIS_{curr}|}{2} \quad 6)$$

where $IpIS_{next}$ is the sending inter-packet time interval for next probe rate, $IpIS_{curr}$ is the sending inter-packet time interval for current probe rate, and IpIR is the inter-packet time interval on reception.

Deviation of jitter affects only the IpIR in the said formula, because other operands are not interacting with the network. Consequently, if packet delay jitter deviation was big, the obtained value IpIR could be much bigger than the real value. In that case, next IpIS could be significantly less than the optimal IpIS. Under optimal conditions the assumed inter-packet interval IpIS is used for generating of a constant rate which approximately is equal to the available bandwidth of the connection. If the sender sends with a probe rate that is less than the available bandwidth, there no increasing trend will be detected and this probe rate will be reported as the available bandwidth.

In the formula (6) the IpIS is increased by the absolute difference between IpIR and IpIS divided by 2. In one embodiment of the invention it is proposed to increase the IpIS value in dependence of the metric JtI as defined in (5). It is suggested to express this dependence as a Step Decreasing Factor—SDF(JtI) as formulated in (3):

$$IpIS_{next} = IpIS_{curr} + \frac{|IpIR - IpIS_{curr}|}{SDF(JtI)} \quad 3)$$

Whereby it is proposed to define SDF as follows:

$$SDF(JtI) = \begin{cases} 1.5, & \text{if } JtI < 0.5 \\ 1.08 \cdot \exp(0.65 \cdot JtI), & \text{if } JtI \geq 1 \end{cases} \quad 4)$$

Figure 13:
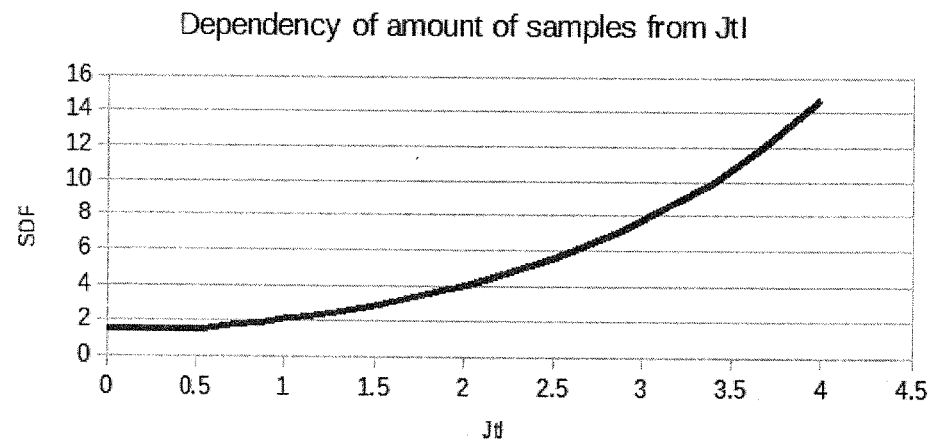
FIG. 13 shows the dependency of the proposed step decreasing factor to be used in the bandwidth test in accordance to the invention on the determined jitter of the probe sample packets.

Graphically the function as defined in formula (4) is presented in FIG. 13.

According to the function—if the deviation of jitter is significant in comparison to the inter-packet Interval, $IpIS_{next}$, it tends faster to IpIR, if not—slower. Such method provides an opportunity to decrease the amount of iterations in case of low jitter without losing the accuracy of measurements. In the opposite case, the method will need more iterations to deliver a reasonable accuracy.

For the experiments carried out for testing the step decreasing factor, a network was utilized in which the OWD value is 40 ms, and the OWD values are distributed according to normal law with a standard deviation of 0.3 ms.

Figure 14A:
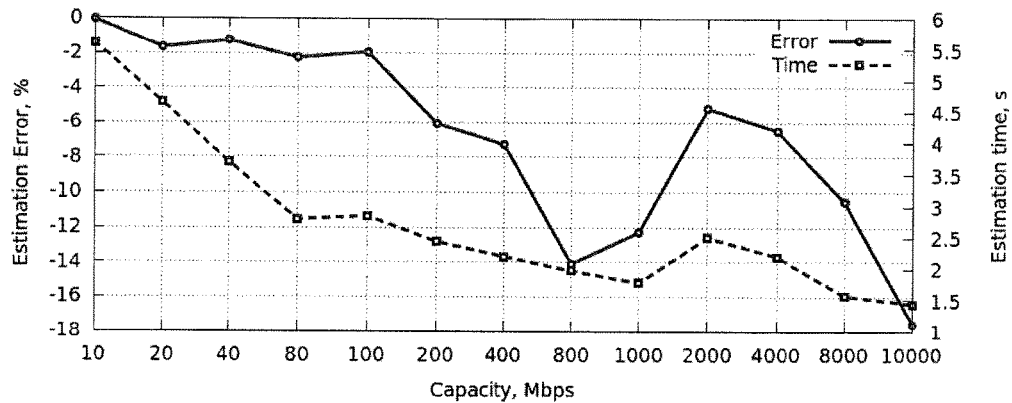
FIG. 14 shows the test results in terms of accuracy of estimated available bandwidth and corresponding estimation time in dependence of the data rate in a); the corresponding number of iterations for the same measurement points in b); and the corresponding load of the available bandwidth on the data pipe due to the sending of probe packets for the available bandwidth test in c) for a test in which per iteration a train with a variable amount of probe sample packets is sent with presence of jitter and where the network jitter is taken into account in a classical way.
Figure 14B:
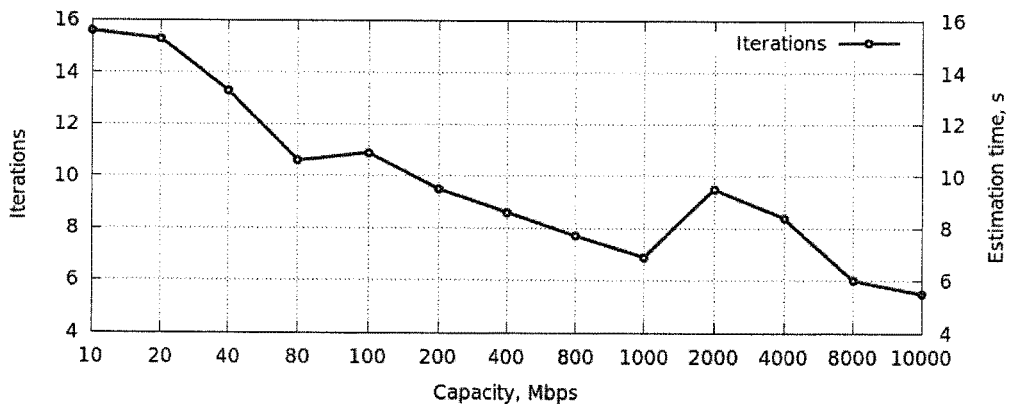
Figure 14C:
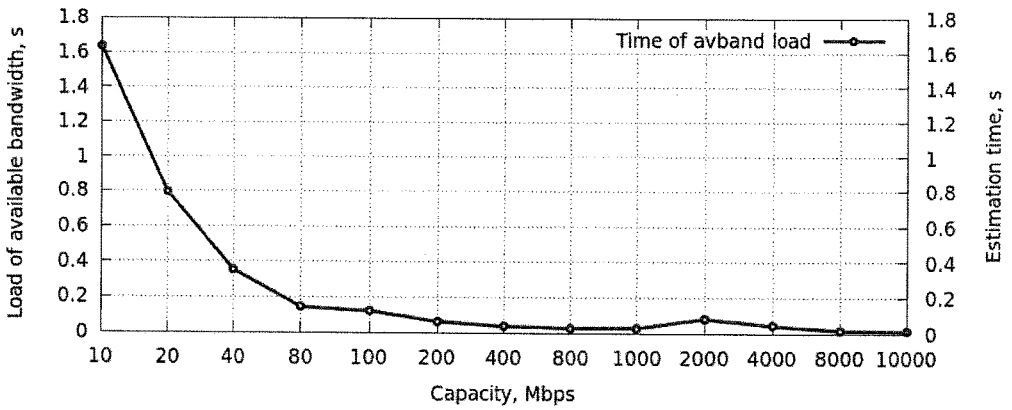

Firstly, measurement results are depicted in presence of jitter without use of the step decreasing factor SDF. It is noted that the variable amount of probe sample packets per iteration is also applied in this test. This is shown in the figures generally denoted as FIG. 14.

The relative error in that case shows the value −18% from the real available bandwidth, at the maximum bit rate of 10 Gbps, which is quite big.

Since OWD for all tests are distributed according to normal law with relatively high standard deviation, the parameter JtI will be also be big—(e.g. close to 6 Gbps the value of JtI is about 2.5-3). The behavior of measurements with applied Step Decreasing Factor as in formula (3) is presented in the figures generally denoted as FIG. 15.

Figure 15A:
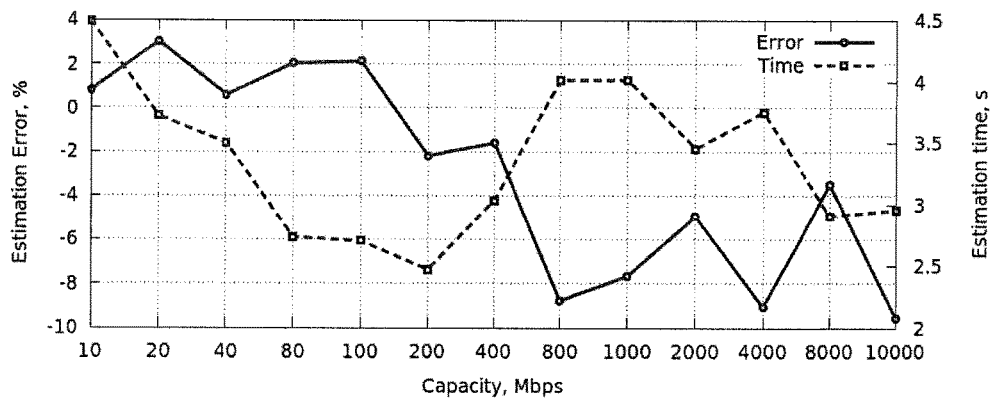
FIG. 15 shows the test results in terms of accuracy of estimated available bandwidth and corresponding estimation time in dependence of the data rate in a); the corresponding number of iterations for the same measurement points in b); and the corresponding load of the available bandwidth on the data pipe due to the sending of probe packets for the available bandwidth test in c) for a test in which per iteration a train with a variable amount of probe sample packets is sent with presence of jitter and where the network jitter is taken into account in accordance to the invention with a variable step decreasing factor.
Figure 15B:
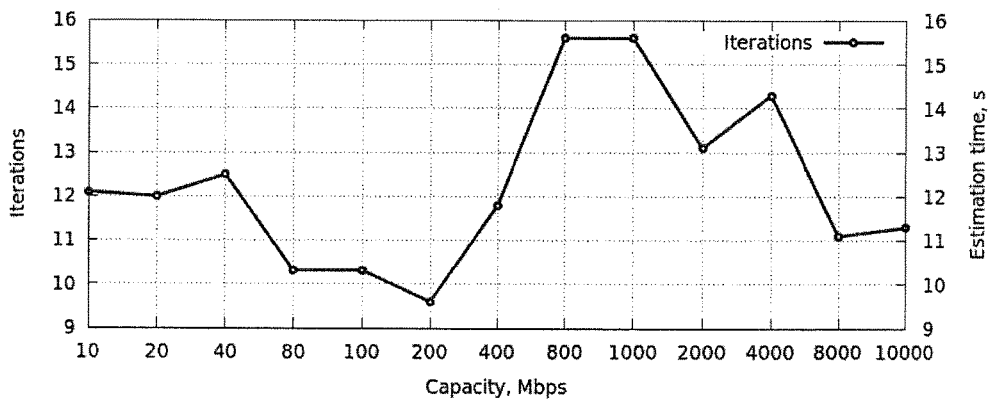
Figure 15C:
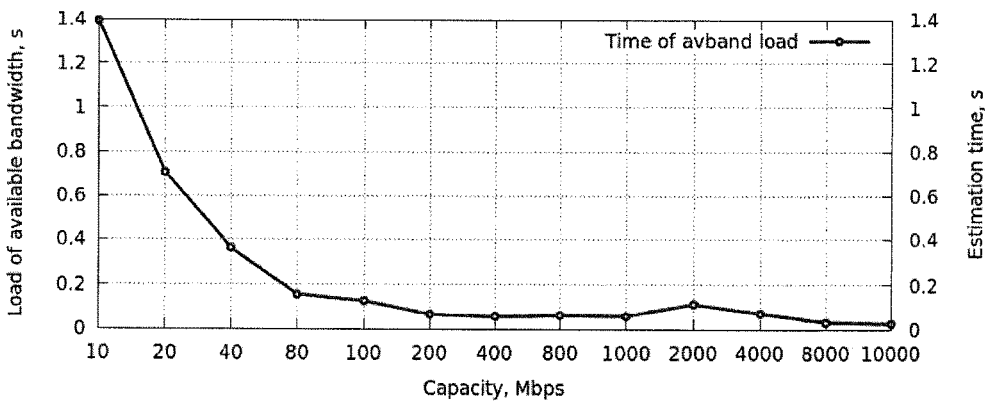

FIG. 15a shows that the estimation error among all the tests is not greater than 10%. It is also observable, that for low bandwidths of up to 100 Mbps, the amount of iterations in general is less than presented in FIG. 14 and, according to it, the time of estimation on such bandwidths is also lower. For example by a rate of 20 Mbps in FIG. 15 the measurement has about 12 iterations; by rate 80 in FIG. 12, the measurement has about 18 iterations. The opposite picture is for bandwidths higher than 100 Mbps; the amount of iterations is increased and the measurement time is increased, however the absolute value of estimation error is significantly decreased. This behavior is easy to explain. Among all the tests there exists the same OWD value and its standard deviation according to normal law. It means that on lower bandwidths, the deviation is lower than the inter-packet interval and on higher bandwidths—the deviation is commensurate to the inter-packet interval, or bigger. According to it, JtI (formula 5) will be bigger, and thus SDF is also bigger. It makes the iteration steps smaller, and more iterations are required to produce an accurate measurement. However, more iterations on higher bandwidths is not a very big problem, since each iteration takes less time.

The invention will be used in a network monitoring/testing device for measuring network performance. Such a device is helping to optimize the data throughput in a network by adjusting the delay times in between two packet transmissions and the data rate. The aim is to utilize the available network bandwidth in optimized fashion while at the same time congestion shall be avoided. This adjustment process may be repeated periodically, e.g. every minute or every $2^{nd}$ minute. As the management of Quality of Service (QoS) in the Internet is becoming more and more advanced, the described method might also be used in sophisticated QoS managers. Such network monitoring or testing devices can be based on a normal PC or workstation on which a corresponding network performance testing software is installed. Preferably the software is designed to have both capabilities a) to perform the method steps according to the invention with respect to the source device 20 of the performance test and b) to perform the method steps according to the invention with respect to the destination device 21 of the performance test. During the test the software in the source device is configured to perform the steps of the source device 20 and the software in the destination device is configured to perform the steps of the destination device 21. Examples of such network monitoring/testing tool software in which the invention could be implemented are the commercially available software tools like WIRESHARK etc.

The invention may also be used in connection with the UDP or UDT protocol or in connection with a modified version of the TCP protocol. UDT stands for UDP-based data transfer protocol and is primarily made for the implementation in the transport protocols which are suitable for the use in high-speed networks with data rates in the range of 10 Gbit/s. The UDT protocol is capable to provide a 10

Gigabit point-to-point or point-to-multipoint data transmission over Internet links and features congestion/flow control techniques.

In the case of implementation in UDT, the invention will preferably be utilized in the following way: The server which is requested to send a file/web page to a client is transmitting a first train of probe sample packets. The client will perform the calculation of the recommended IpIS time and send it back to the server (e.g. in a SOAP message). The server then adjusts the IpIS time and sends a second train of UDT probe sample packets corresponding to the set new IpIS time. The client will again send a feedback message with recommended IpIS time. This testing procedure goes on until the recommended IpIS time is close to the calculated IpIR time with regard to the set tolerance. Then the server exclusively sends the UDP data packets without interruption whereby the inter packet time interval for the sending of UDT packets corresponds to the last recommended IpIS time.

In the case for a possible use in TCP, the invention will preferably be utilized in the following way: The server which is requested to send a file/web page to a client is transmitting a first train of probe sample packets via TCP and sends, e.g. 20 segments in its usual manner—back to back. The term "back to back" here means that packets will be sent one after the other immediately, without respecting any additional inter-packet time interval. The calculation of the inter-packet time interval for each segment and the building of the mean value will result in an IpIS value for the next iteration. Based on a received feedback message (e.g. by means of a modified TCP ACK message which also contains the IpIR value), the TCP client can adjust a size of congestion window and send the next portion of its fragments into the network with the recommended IpIS value. This will be repeated until the sending rate of TCP will not correspond to the reception rate.

As mentioned above the whole bandwidth test can last a few seconds and that is normally not acceptable for a user who is surfing in the Internet. Of course this may depend on the application. For software updates/downloads or some audio/video AV streaming content it may be acceptable to execute the complete bandwidth test before starting out with delivering the requested content to the client. In particular the invention might be implemented in software tools for accelerating the data throughput in wide area networks.

In addition to the preferred embodiments described above, the invention may also be used as part of a new transport protocol other than TCP or RTP be it a connectionless transport protocol or a connection-oriented transport protocol.

The features of the invention as disclosed in the above description, in the claims and in the drawing may be of importance for the implementation of the various embodiments of the invention both individually and in any desired combination.

What is claimed is:

1. A method for performing a bandwidth test for communication from a first network station to a second network station of a communication network, the method comprising the steps of:
   at the first network station, transmitting a train of probe sample packets to the second network station, wherein the train of probe sample packets has a nominal inter packet time interval;
   measuring, at the second network station, receiving times of the probe sample packets to determine a perceived inter packet time interval;
   comparing, at the second network station, the perceived inter packet time interval with the nominal inter packet time interval of the train of probe sample packets to estimate a recommended inter packet time interval;
   receiving at the first network station, a feedback message from the second network station containing the recommended inter packet time interval;
   transmitting from the first network station a second train of probe sample packets adjusted to the recommended inter packet time interval; and
   iteratively repeating the steps of measuring, comparing, receiving the feedback message and transmitting at the recommended inter packet time interval until the recommended inter packet time interval is equal to an adjusted nominal inter packet time interval within limits of a set tolerance, wherein the number of probe sample packets in the train of probe sample packets is varied per iteration and the number of probe sample packets increases with a probe sample packet bit rate with which the train of probe sample packets is transferred to the second network station.

2. The method of claim 1, wherein an estimation of the number of probe sample packets for a given train of probe sample packets is determined by the first network station according to:

$$N(R) = \begin{cases} 50, & \text{if } R < 100 \text{ Mbps} \\ 32.57 \cdot \ln(0.046 \cdot R), & \text{if } R \geq 100 \text{ Mbps} \end{cases}$$

where R is the probe sample packet bit rate in Mbps used for a next iteration, and
N is the number of probe sample packets to be sent in the next iteration.

3. The method of claim 2, wherein the estimations of the number of probe sample packets are calculated according to a formula that produces a number of probe packet samples that falls within +/−20 percent of calculations performed using the formula for estimation of the number or probe sample packets for a given train of probe sample packets.

4. The method of claim 1, wherein said recommended inter packet time interval estimated by the second network station is based on a measure of network jitter, wherein an adjustment step of said recommended inter packet time interval compared to a previous recommended inter packet time interval is reduced by a step decreasing factor (SDF) dependent on said measure of network jitter.

5. The method of claim 4, wherein the step decreasing factor is determined according to:

$$SDF(JtI) = \begin{cases} 1.5, & \text{if } JtI < 0.5 \\ 1.08 \cdot \exp(0.65 \cdot JtI), & \text{if } JtI \geq 1 \end{cases}$$

wherein JtI is defined by:

$$JtI = \frac{\sigma_{jitter}}{IpIR},$$

where $\sigma_{jitter}$ is a standard deviation of network jitter, and
IpIR is the mean inter packet time interval as perceived in the second network station during the last prior iteration.

6. A network station comprising:
a network communication processor; and
a memory in communication with said network communication processor, wherein said memory contains instructions, which when executed by the network communication processor cause the network station communication processor to be configured to:
initiate a bandwidth test for communications from said network station to a second receiving network station comprising:
  sending to the second receiving network station, a first train of probe sample packets having a nominal inter packet time interval;
  receiving from said second receiving network station, a feedback message including a recommended inter packet time interval;
  sending out a second train of probe sample packets having an adjusted inter packet time interval corresponding to the recommended inter packet time interval received in the feedback message; and
  iteratively receiving feedback messages from said second receiving network station and sending out an additional train of probe sample packets having an updated adjusted nominal inter packet time interval until the recommended inter packet time interval is within a predetermined tolerance of the adjusted nominal inter packet time interval, wherein a number of probe sample packets in each train of probe sample packets is varied for each iteration, the number of probe sample packets increasing with a probe sample packet bit rate at which the train of probe sample packets is transferred to the second receiving network station.

7. The network station of claim 6, wherein the network communication processor is further configured to calculate the number of probe sample packets for a given train of probe sample packets for a given iteration according to:

$$N(R) = \begin{cases} 50, & \text{if } R < 100 \text{ Mbps} \\ 32.57 \cdot \ln(0.046 \cdot R), & \text{if } R \geq 100 \text{ Mbps} \end{cases}$$

where R is the probe sample packet bit rate in Mbps used for a next iteration, and
N is the number of probe sample packets to be sent in the next iteration.

8. The network station of claim 6 wherein the network communication processor is further configured to calculate estimations of the number of probe sample packets for a given iteration according to a formula that produces a number of probe packet samples that falls within +/−20 percent of calculations performed using a formula for estimation of the number of probe sample packets for a given train of probe sample packets.

9. The network station of claim 6, wherein the network communication processor is further configured to receive a recommended inter packet time interval based in part on a measure of network jitter.

10. The network station of claim 9, wherein an adjustment step of said recommended inter packet time interval compared to a previous recommended inter packet time interval is reduced by a step decreasing factor according to:

$$SDF(JtI) = \begin{cases} 1.5, & \text{if } JtI < 0.5 \\ 1.08 \cdot \exp(0.65 \cdot JtI), & \text{if } JtI \geq 1 \end{cases}$$

wherein JtI is defined by:

$$JtI = \frac{\sigma_{jitter}}{IpIR},$$

where $\sigma_{jitter}$ is a standard deviation of network jitter, and
IpIR is the mean inter packet time interval as perceived in the second receiving network station during a prior iteration.

* * * * *